United States Patent
Rice et al.

(10) Patent No.: US 12,365,146 B1
(45) Date of Patent: Jul. 22, 2025

(54) BONDED NUTPLATE RAPID CURE SYSTEM WITH FIXTURED HEATER

(71) Applicant: Kineticure, LLC, Miamisburg, OH (US)

(72) Inventors: Jason P. Rice, Dayton, OH (US); Michael J. Hood, Springboro, OH (US)

(73) Assignee: Kineticure, LLC, Miamisburg, OH (US)

( * ) Notice: Subject to any disclaimer, the term of this patent is extended or adjusted under 35 U.S.C. 154(b) by 195 days.

(21) Appl. No.: 18/456,101

(22) Filed: Aug. 25, 2023

Related U.S. Application Data

(60) Provisional application No. 63/373,937, filed on Aug. 30, 2022.

(51) Int. Cl.
*B29C 65/78* (2006.01)
*B29C 65/00* (2006.01)
*B29C 65/02* (2006.01)
*B29C 65/48* (2006.01)

(52) U.S. Cl.
CPC .......... *B29C 65/7838* (2013.01); *B29C 65/02* (2013.01); *B29C 65/481* (2013.01); *B29C 66/91231* (2013.01); *B29C 66/91421* (2013.01)

(58) Field of Classification Search
CPC ... B29C 65/7838; B29C 65/02; B29C 65/481; B29C 66/91231; B29C 66/91421
See application file for complete search history.

(56) References Cited

U.S. PATENT DOCUMENTS

| | | |
|---|---|---|
| 5,013,391 A | 5/1991 | Hutter, III et al. |
| 5,197,839 A | 3/1993 | Willey et al. |
| 5,704,747 A | 1/1998 | Hutter, III et al. |
| 8,511,953 B2 | 8/2013 | Roosa et al. |
| 10,385,905 B1 * | 8/2019 | Rice ...................... F16B 11/006 |
| 2003/0091408 A1 | 5/2003 | Toosky |
| 2006/0075617 A1 | 4/2006 | Toosky et al. |

(Continued)

FOREIGN PATENT DOCUMENTS

EP 744555 A1 11/1996

OTHER PUBLICATIONS

Click Bond "Nutplates", http://www.clickbond.com/products/nutplates/.

(Continued)

*Primary Examiner* — George R Koch
(74) *Attorney, Agent, or Firm* — Dinsmore & Shohl LLP

(57) ABSTRACT

Embodiments of systems and methods for positioning and bonding a nutplate to a substrate comprising at least one aperture, wherein the system includes a nutplate retention fixture formed from a threaded insert and an elastomeric tube engaged with the threaded insert; a heater assembly formed from a heating element, a temperature sensor operable to measure the temperature of the heating element, and a heater housing; a heater retention fixture operable to engage with the nutplate retention fixture and maintain the heater assembly in contact with the substrate; and a heater controller operable to control the output from the heating element. The heater retention fixture includes a spring-loaded nut clamp provided concentrically around the threaded insert and configured to secure the heater retention fixture to the nutplate retention fixture.

20 Claims, 6 Drawing Sheets

(56) References Cited

U.S. PATENT DOCUMENTS

| | | | |
|---|---|---|---|
| 2007/0048107 | A1 | 3/2007 | Johnson et al. |
| 2007/0141289 | A1 | 6/2007 | Hutter, III |
| 2007/0224016 | A1 | 9/2007 | Toosky et al. |
| 2008/0101888 | A1 | 5/2008 | Toosky et al. |
| 2009/0126180 | A1 | 5/2009 | Keener |
| 2010/0166523 | A1 | 7/2010 | Roosa et al. |
| 2011/0150599 | A1 | 6/2011 | Bakken et al. |
| 2011/0182692 | A1 | 7/2011 | Reid et al. |
| 2014/0161556 | A1 | 6/2014 | Toosky et al. |
| 2015/0368823 | A1 | 12/2015 | Curran et al. |
| 2017/0339749 | A1* | 11/2017 | Hutter, III .............. H05B 6/10 |
| 2018/0266461 | A1 | 9/2018 | Cheynet De Beaupre et al. |

OTHER PUBLICATIONS

Click Bond, "Click Bond Nutplate/Hysol 9309.03 Installation and Removal Procedure", ftp://sidads.colorado.edu/pub/DATASETS/nsidc0587_ICESAT_GLAS_LTA/Section1_Preflight-Pre-Operations%20Calibration/Click%20Bond%20Nutplate,%20Install%20and%20Removal.pdf, Released by GLAS CMO Dec. 9, 2002.

Rumble, John R. ed., "Thermal Conductivity of Alloys as a Function of Temperature," CRC Handbook of Chemistry and Physics, 100th Edition (Internet Version 2019), CRC Press/Taylor & Francis. http://hbcponline.com/faces/documents/12_30/12_30_0001.xhtml.

* cited by examiner

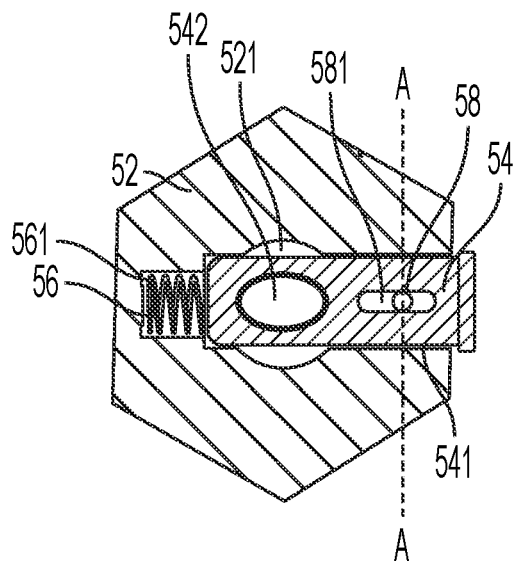 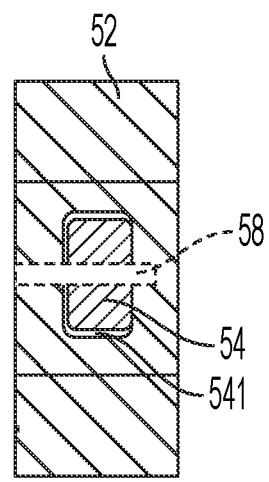
FIG. 6A  FIG. 6B
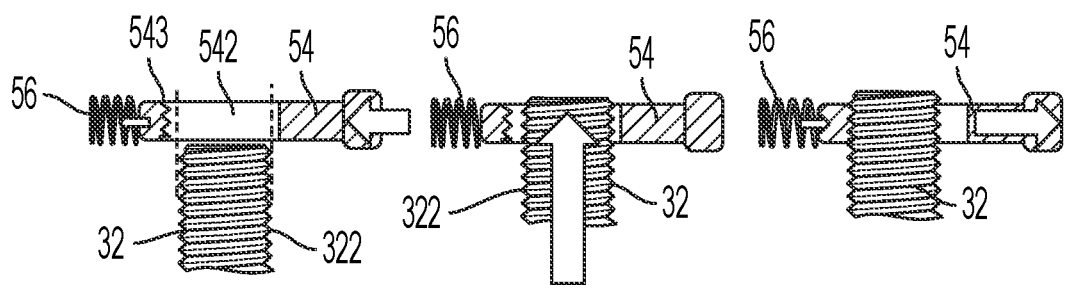
FIG. 7A  FIG. 7B  FIG. 7C

BONDED NUTPLATE RAPID CURE SYSTEM WITH FIXTURED HEATER

CROSS-REFERENCE TO RELATED APPLICATIONS

This application claims priority to U.S. Provisional Application 63/373,937 filed Aug. 30, 2022, which is incorporated by reference herein in its entirety.

STATEMENT REGARDING FEDERALLY SPONSORED RESEARCH OR DEVELOPMENT

This invention was made with Government support under Contract No. FA8650-17-C-5068 awarded by the U.S. Air Force Materiel Command to Cornerstone Research Group Inc. The Government has certain rights in the invention.

TECHNICAL FIELD

Embodiments described herein relate generally to rapid curing systems for bonding hardware to substrates or substructures and more particularly to a bonded nutplate rapid cure system with a fixture heater and methods of using the same.

BACKGROUND

Adhesively bonded hardware, which are fasteners such as nutplates, bushings, threaded inserts, sleeves, mounts, brackets, etc., are commonly used to secure structural elements during installation or repair. Bonded hardware is used on a variety of systems including: aircraft, spacecraft, watercraft, automobiles, and industrial equipment. Adhesively bonded hardware is also used to join components of dissimilar materials or when welding or riveting is not an option. Bonded hardware typically experiences failure in the form of mechanical wear, structural deformation, or separation of the hardware from the mounting substrate (i.e., disbond).

Damaged hardware found during routine maintenance requires timely replacement and approved repair techniques often mandate the use of certified adhesives. Unfortunately, approved repair adhesives are typically those used during original factory installation. Approved hardware adhesives are generally two-part epoxies whose performance specifications are determined by a lengthy cure (e.g. 24 hour) at room temperature. This specific curing time is necessary for the adhesive to develop the strength required to hold the hardware in place for attaching other components (e.g., reattaching an access panel to an aircraft). This long cure time can negatively impact the system's availability. Timely repair is critical to maximizing availability of military aircraft and minimizing logistical impacts on commercial aircraft as well.

In the aerospace industry, nutplates are commonly used to attach to aircraft panels. In this case, the 24 hour curing time is highly problematic, because this long cure time can negatively impact the aircraft's availability. To expedite nutplate repair processes, supplemental heating has been utilized to accelerate the curing rate of adhesives. However, the accelerated cure profile must be well controlled to achieve desired adhesive properties (e.g., tensile strength, shear strength, peel strength, etc.) and nutplate load ratings (e.g., push-out force and maximum torque) while also preventing damage to the surrounding structure due to excessive temperature exposure. Moreover, the delivery of heat to the bonded nutplate area poses issues, because delivering heat in an aircraft environment with flammable liquids or vapors present is a potential safety hazard.

Accordingly, there is an ongoing search for improved bonded hardware cure systems capable of delivering heat to specific localized areas to reliably and safely reducing the adhesive cure time thereby reducing the installation and repair time for bonded nutplates to increase aircraft manufacturing and maintenance efficiency.

SUMMARY

Embodiments of the present disclosure meet those needs by providing a method and devices to accelerate adhesive cure by decreasing cure time through heating. Specifically, a new heater assembly is disclosed with corresponding heater controller to deliver direct localized heating to the nutplate adhesive bond line to enable safe, controllable accelerated adhesive cure for adhesive bonded nutplate installation. The heater assembly typically comprises multiple fixtures, including but not limited to a heating element, a heater housing, a heater retention fixture, and a nutplate retention fixture.

One method to decrease cure time is to supply adequate heating to the adhesive bond line; however, such method has previously presented challenges. First, many nutplates are at locations where access is limited thus require additional tools to help positioning and bonding of the nutplate to the substrate. Second, some nutplates may not be open to conventional direct contact heating equipment such as heating blanket or hot air heat gun, thus requiring the heating operations to supply heat through the substrate with these conventional heating devices which imposes the risks of damaging the substrate with excessive heat and/or imposing safety risk in the presence of volatiles (e.g. fuel vapors). Third, it is impractical for the current commercially available heating devices to confine the delivery of heat to a single nutplate to perform the required installation or replacement, thus risking unexpected damage to the surrounding functional bonded nutplates and substrate. Furthermore, the heating profile used to heat the bondline has to be accurately executed to ensure an adequate degree of cure of the adhesive is achieved as improper cure can lead to reduced performance and premature failure. The devices and methods described herein address all these challenges by providing direct localized heating to the adhesive bond line via thermal conduction through the thermally conducting substrate.

According to one embodiment of the present disclosure, a system for positioning and bonding a nutplate to a substrate comprising at least one aperture is provided. The system comprises a nutplate retention fixture comprising a threaded insert and an elastomeric tube engaged with the threaded insert, wherein the threaded insert is operable to engage the nutplate at one end and extend through one aperture of the substrate, the threaded insert comprises at least two distinct regions of external threads, with a first region configured for threaded engagement with internal threads on the nutplate and a second region having an opposite handedness than the first region, and the elastomeric tube is configured to anchor the nutplate retention fixture at the aperture and secure the nutplate in contact with the substrate. The system further comprises a heater assembly disposed concentrically around the nutplate retention fixture and operable to deliver heat to a bonding surface of the nutplate, wherein the heater assembly comprises: a heating element, a temperature sensor operable to measure the temperature of the heating element, and a heater housing, the heater housing comprising a hollow interior to encase the heating element. The system also comprises a heater controller operable to control the output from the heating element. Further, the system comprises a heater retention fixture operable to engage with the nutplate retention fixture and maintain the heater assembly in contact with the substrate, wherein the heater retention fixture comprises a spring-loaded nut clamp provided concentrically around the threaded insert aligned with the second region of the external threads at a position distal the substrate relative to the heater assembly and configured to secure the heater retention fixture to the nutplate retention fixture.

According to a further embodiment, a method of positioning and bonding a nutplate to a substrate comprising at least one aperture is provided. The method comprises coupling a nutplate with a nutplate retention fixture, the nutplate retention fixture comprising a threaded insert and an elastomeric tube engaged with the threaded insert, wherein the threaded insert is operable to engage the nutplate at one end and extend through one aperture of the substrate, the threaded insert comprises at least two distinct regions of external threads, with a first region configured for threaded engagement with internal threads on the nutplate and a second region having an opposite handedness than the first region, and the elastomeric tube is configured to anchor the nutplate retention fixture at the aperture and secure the nutplate in contact with the substrate. The method further comprises applying adhesive onto a bonding surface of the nutplate; inserting the nutplate retention fixture through an aperture of the panel until a surface of the panel contacts the bonding surface having adhesive applied thereon; removing a portion of the elastomeric tube to expose the second region of the external threads of the threaded insert; and positioning a heater assembly concentrically around the nutplate retention fixture in a position operable to deliver heat to the bonding surface of the nutplate. The heater assembly comprises: a heating element, a temperature sensor operable to measure the temperature of the heating element, and a heater housing, the heater housing comprising a hollow interior to encase the heating element. The method further comprises securing a heater retention fixture to the nutplate retention fixture to maintain the heater assembly in contact with the substrate, wherein the heater retention fixture comprises a spring-loaded nut clamp provided concentrically around the threaded insert aligned with the second region of the external threads at a position distal the substrate relative to the heater assembly and configured to secure the heater retention fixture to the nutplate retention fixture. Finally, the method comprises adhering the nutplate to the bonding surface of the panel by applying heat through the heater assembly.

These and other embodiments are described in more detail in the following Detailed Description.

BRIEF DESCRIPTION OF THE DRAWINGS

The following detailed description of specific embodiments of the present disclosure can be best understood when read in conjunction with the following drawings, where like structure is indicated with like reference numerals.

FIG. 6A is a schematic view of a heater retention fixture according to one or more embodiments of the present disclosure.

FIG. 6B is a cross-section view of the heater retention fixture of FIG. 6A along A-A according to one or more embodiments of the present disclosure.

FIGS. 7A-7C are illustrations of attachment of the heater retention fixture to the threaded insert according to one or more embodiments of the present disclosure.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Embodiments of the present disclosure are directed to systems for positioning and bonding a nutplate to a substrate and methods that apply localized heating to the bonding surface (i.e., the adhesive bondline between a substrate and nutplate) to accelerate the cure time required to securely bond the nutplate onto the substrate. Bonding surface may alternatively be referenced as the bondline or adhesive bondline. As used herein, "localized heating" means focused heating directed to the bonding surface, and limiting heating of the surrounding environment, particularly the surrounding substrate, by directing heating to the target region of the bonding surface. The focused heating of the substrate in the region of the bonding surface allows efficient heat transfer through conduction to the adhesive bonding surface of the nutplate. For illustration, we have included a discussion of embodiments of the system for positioning and bonding a nutplate to a substrate, specifically, systems wherein nutplates are adhered to panels (e.g., aircraft panels).

Figure 1:
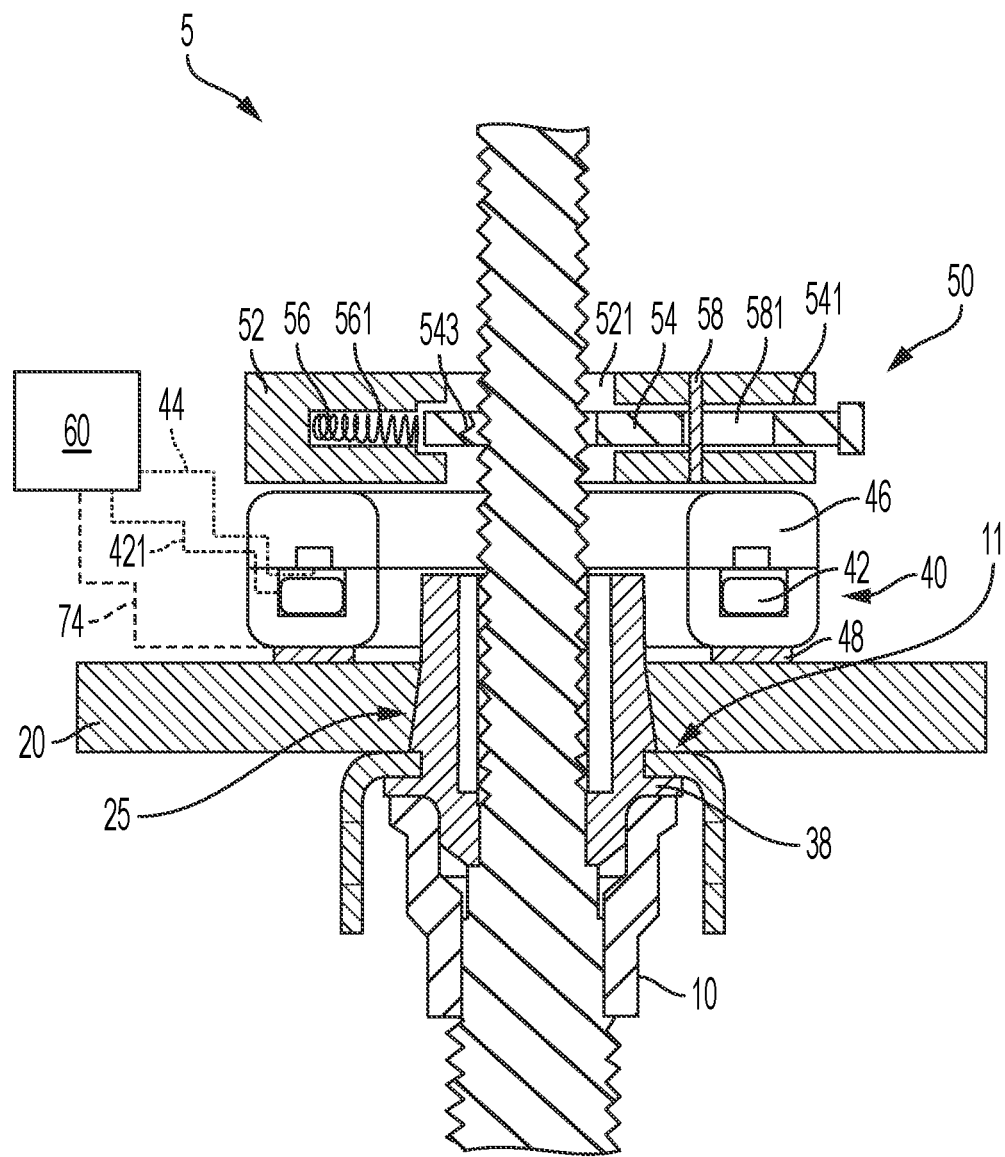
FIG. 1 is a cross sectional view of a system for positioning and bonding a nutplate to a substrate comprising at least one aperture according to one or more embodiments of the present disclosure.

Referring to the embodiment of FIG. 1, a nutplate retention system 5 for securing a nutplate 10 to a substrate is depicted. The depicted substrate is a panel 20. The nutplate retention system 5 enables application of localized heating to accelerate the curing rate of the adhesively bonded nutplates. Specifically, focused heating is directed to the bonding surface 11 (i.e. the adhesive bondline between the nutplate 10 and the panel 20). The positioning of the heater assembly 40 allows efficient heat transfer through heat conduction to the bonding surface 11 to cure the adhesive and bond the nutplate 10 to the panel 20. Alternate non-localized heating methods, such as the use of electric heating blanket, hot air with heat gun, and inductive heating on hardware on a metal substructure, will likely result in excessive or non-localized heating of the panel 20 or substructure, which may continue to transfer heat into the adhesive at the bonding surface 11 after a desirable cure state of the adhesive is achieved. The continued transfer of heat into the adhesive at the bonding surface 11 may result in undesirable adhesive or substructure material properties (i.e. overcuring of adhesive). In addition, operating these alternate heating methods is especially challenging when there is limited space or access to the back side portion of the structure where the nutplate 10 will reside during installation or repair, since the equipment needed for the alternate methods are generally bulky and may not be compatible with the limited space available. Furthermore, the use of non-localized heating may cause potential safety hazard in an environment that has ignitable organic vapor.

Figure 2:
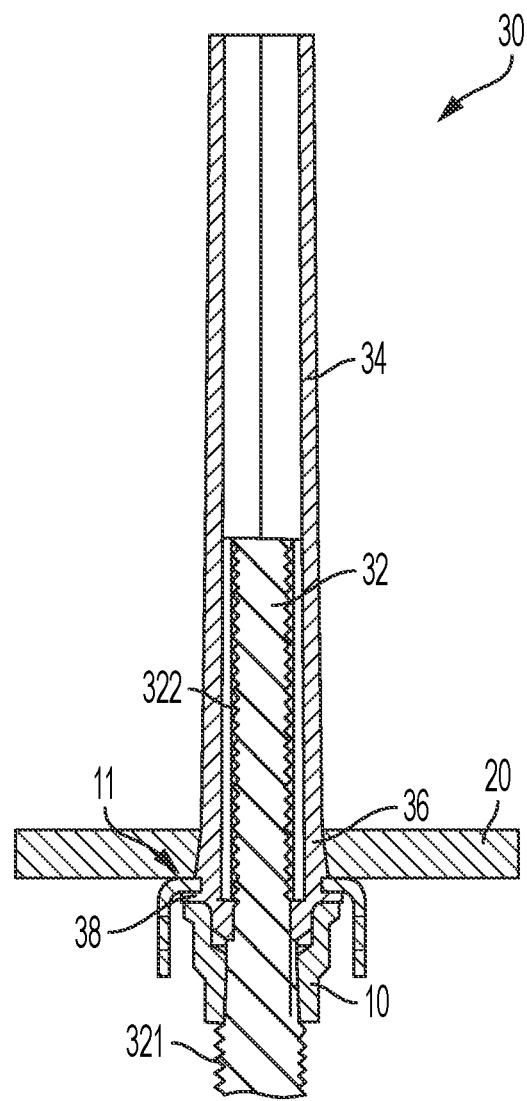
FIG. 2 is a cross sectional view of a nutplate retention fixture engaged with a nutplate according to one or more embodiments of the present disclosure.

With continued reference to FIGS. 1 and 2, a system for positioning and bonding a nutplate 10 to a substrate 20 comprising at least one aperture 25 comprises a nutplate retention fixture 30, a heater assembly 40, a heater retention fixture 50, and a heater controller 60. The nutplate retention fixture 30 includes a threaded insert 32 and an elastomeric tube 34 engaged with the threaded insert 32. The threaded insert 32 is operable to engage the nutplate 10 at one end and extend through one aperture 25 of the substrate 20. Further, the threaded insert 32 comprises at least two distinct regions of external threads, with a first region 321 configured for threaded engagement with internal threads 17 on the nutplate 10 and a second region 322 having an opposite handedness than the first region 321. The elastomeric tube 34 is configured to anchor the nutplate retention fixture 30 at the aperture 25 and secure the nutplate 10 in contact with the substrate 20. The heater assembly 40 is disposed concentrically around the nutplate retention fixture 30 and operable to deliver heat to the bonding surface 11 of the nutplate 10. The heater assembly 40 comprises a heating element 42, a temperature sensor 44 operable to measure the temperature of the heating element 42, and a heater housing 46. The heater housing 46 comprises a hollow interior to encase the heating element 42. The heater retention fixture 50 is operable to engage with the nutplate retention fixture 30 and maintain the heater assembly 40 in contact with the substrate 20. The heater retention fixture 50 comprises a spring-loaded nut clamp provided concentrically around the threaded insert 32 and aligned with the second region 322 of the external threads at a position distal the substrate 20 relative to the heater assembly 40 and configured to secure the heater retention fixture 50 to the nutplate retention fixture 30. Further, the heater controller 60 is operable to control the output from the heating element 42 to provide desired heating to the bonding surface 11.

Figure 8:
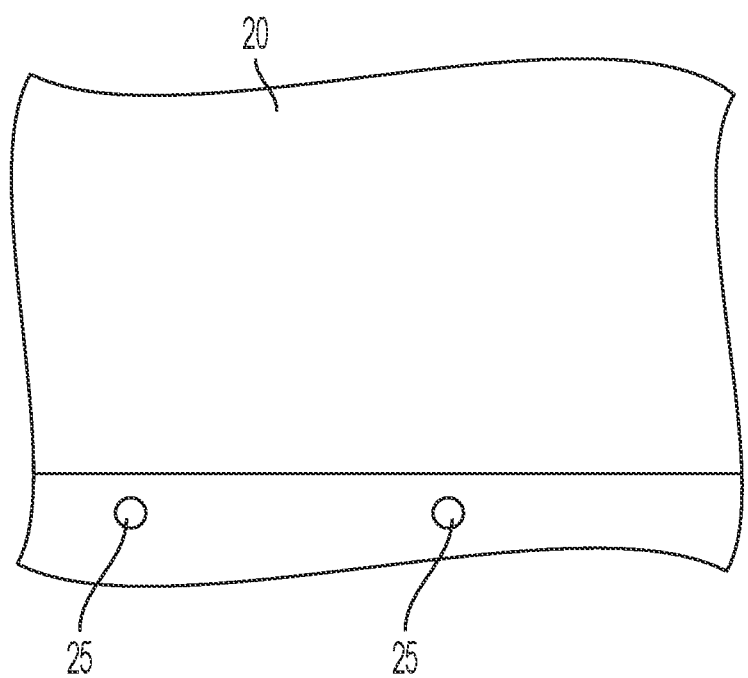
FIG. 8 is a schematic view of a panel having an aperture for subsequent attachment to the nutplate according to one or more embodiments of the present disclosure.

As shown in FIG. 1 the panel 20 comprises at least one aperture 25. Multiple apertures 25 are contemplated as shown in the embodiment of FIG. 8. Moreover, various materials are considered suitable for the panel 20. For example and not by way of limitation, the panel 20 may comprise metal, plastic, aluminum, titanium, ceramic, fiber reinforced polymer matrix composite, ceramic matrix composite, or combinations thereof. The panel 20 may comprise two different material layers fastened together to form a single panel.

Having generally described the system 5 for positioning and bonding a nutplate 10 to a substrate 20, each of the various subsystems and components will be provided in further detail.

Figure 9A:
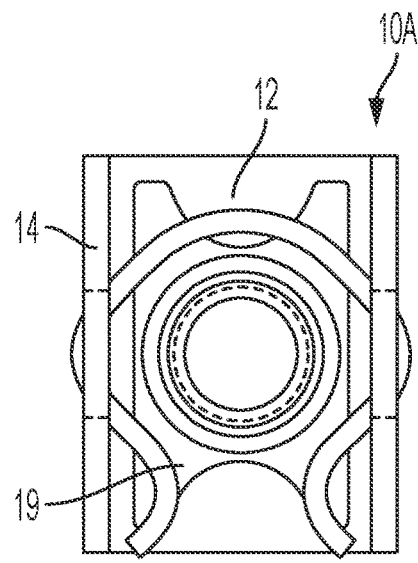
FIG. 9A is a top view of the outer surface of an open style nutplate utilized in a system for positioning and bonding a nutplate to a substrate comprising at least one aperture according to one or more embodiments of the present disclosure.
Figure 9B:
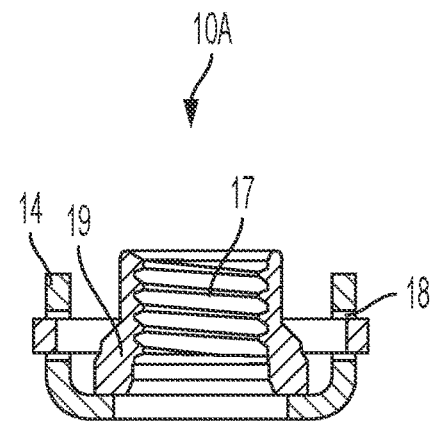
FIG. 9B is cross-sectional view of FIG. 9A.

Referring to the embodiments of FIGS. 9A and 9B, the nutplate 10 comprises a substantially U-shaped profile with an open top to form an open style nutplate 10A. The substantially U-shaped profile of the open style nutplate 10A is formed from an open style nutplate flat region 12 and two parallel flanges 14. Further, the open style nutplate 10A comprise a threaded hole 17 within a floating nut element 19 centrally located on the open style nutplate flat region 12.

Figure 10A:
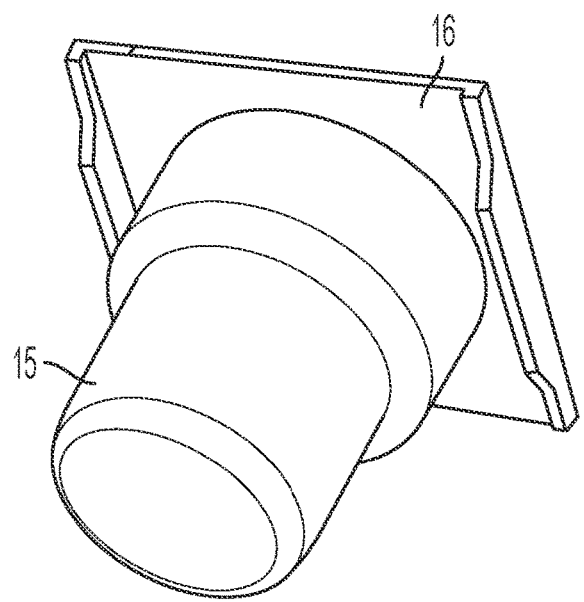
FIG. 10A is a schematic view of the outer surface of a dome style nutplate utilized in a system for positioning and bonding a nutplate to a substrate comprising at least one aperture according to one or more embodiments of the present disclosure.
Figure 10B:
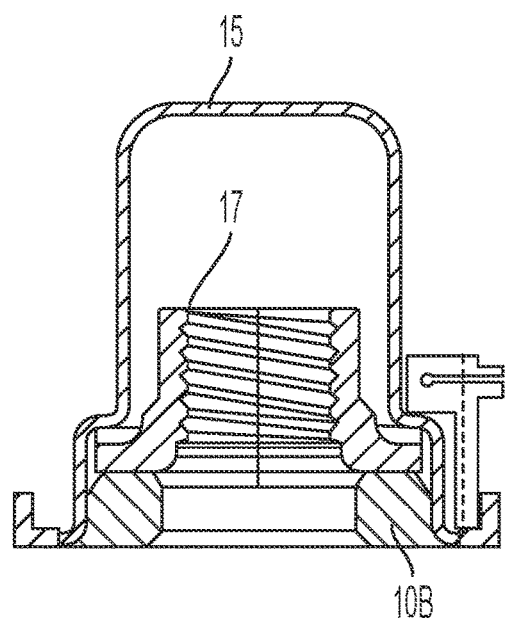
FIG. 10B is cross-sectional view of FIG. 10A.

Referring to the embodiments of FIGS. 10A and 10B, the nutplate 10 comprises a domed region 15 to form a dome style nutplate 10B. The dome style nutplate 10B may also comprise a dome style nutplate flat region 16 adjacent the domed region 15 of the dome style nutplate 10B. Further, the dome style nutplate 10B comprise a threaded hole 17 centrally located on the dome style nutplate flat region 16 and disposed within the domed region 15.

The open style nutplate flat region 12 of the open style nutplate 10A or the dome style nutplate flat region 16 of the dome style nutplate 10B may serve as the bonding surface 11 for the open style nutplate 10A or the dome style nutplate 10B respectively.

Various adhesives are considered suitable in the present embodiments, such as epoxy adhesives, acrylic adhesives, polyurethane adhesives or other adhesives known to the person skilled in the art.

Referring to FIG. 2, the nutplate retention fixture 30 comprises a threaded insert 32 and an elastomeric tube 34. Further, the threaded inert 32 is operable to engage the nutplate 10 at one end and extend through one aperture 25 of the panel 20. The elastomeric tube 34 is engaged with the threaded insert 32 and configured to anchor the nutplate retention fixture 30 at the aperture 25 and secure the nutplate 10, and more specifically the bonding surface 11 of the nutplate 10, in contact against the panel 20.

The threaded insert 32 additionally comprises at least two distinct regions of external threads. A first region 321 of external threads are configured for threaded engagement with internal threads 17 on the nutplate 10 and a second region 322 of external threads having an opposite handedness than the first region 321 of the external threads. The first region 321 of external threads may be sized and configured to mate with the internal threads 17 of the nutplate 10. It will be appreciated that aircraft typically have nutplate sized from 3/16 inch to 1/2 inch. As such, embodiments of the present disclosure may be configured to engage with nutplate sized at 3/16 inch, 1/4 inch, 3/8 inch, or 1/2 inch, for example.

It will be appreciated that the second region 322 of external threads having an opposite handedness than the first region 321 of external threads, for example right-handed threads in the first region 321 and left-handed threads in the second region 322, allows for threading a component onto the second region 322 without unthreading the first region 321 from the nutplate 10. Specifically, opposite handedness threads aid in the installation of the heater retention fixture 50 as tightening the heater retention fixture 50 does not result in unintentional removal of the threaded insert 32 from the nutplate 10.

In one or more embodiments, the second region 322 of the external threads are sized to be smaller than an inner diameter of the elastomeric tube 34 such that the second region 322 of the threaded insert 32 may pass through the elastomeric tube 34 without impingement.

In accordance with embodiments of the present disclosure, the threaded insert is rigid. As used herein, "rigid" means an inflexible material and is in contrast to the rubbery "elastomeric tube" as described below. In one or more embodiments, the threaded insert 32 comprises a material with good thermal conductivity. In one or more embodiments, the threaded insert 32 comprises a thermally conductive material with good thermal conductivity. Such thermally conductive material may be metal or ceramic. For purposes of this disclosure, good thermal conductivity is considered to be in excess of 20 W/mK. In various embodiments the thermal conductivity of the rigid tube may be from 20-200 W/mK, from 50-200 W/mK, at least 50 W/mK, and at least 100 W/mK. Various metals are contemplated as suitable, for example, aluminum, copper, or stainless steel. Various ceramic are contemplated as suitable, for example, silicon carbide, aluminum nitride, or magnesium oxide.

The elastomeric tube 34 is engaged with the threaded insert 32 and provides a resistance fit with the aperture 25 of the panel 20 to temporarily secure the nutplate 10 in contact with the panel 20. With reference to FIG. 2, the elastomeric tube 34 comprises an elongated tube with an internal diameter sized to accept the threaded insert 32 without impingement and an external diameter sized to provide a friction fit with the aperture 25 and retain the elastomeric tube 34 in position.

In one or more embodiments, the external diameter of the elastomeric tube 34 varies along a longitudinal length. Specifically, the elastomeric tube 34 may comprise a flared section 36 with an increased external diameter. The flared section 36 provides a compressive force and/or friction fit with the aperture 25 when the elastomeric tube 34 is inserted therein to engage the nutplate retention fixture 30 with the nutplate 10.

In one or more embodiments, the elastomeric tube 50 may comprise a retaining lip 38 configured to engage with the nutplate 10. The retaining lip 38 is formed from a section of the elastomeric tube 50 comprising an increased diameter and sized to interface with channels or grooves in the nutplate 10. The retentive connection between the nutplate 10 and the elastomeric tube 34 retains the nutplate 10 in engagement with the elastomeric tube 34 until fixation of the threaded insert 32. The retaining lip 38 may also provide a sealing interface to prevent adhesive migration into the internal threads 17 of the nutplate 10.

Various materials are contemplated for the elastomeric tube 34 as depicted in at least FIGS. 1 and 2. These materials may include thermoplastic elastomer, thermosetting elastomer, or combinations thereof. For example and not by way of limitation, the elastomer may include one or more components selected from silicone rubber, polyurethane elastomer, fluoroelastomer, and perfluoroelastomer.

Figure 3:
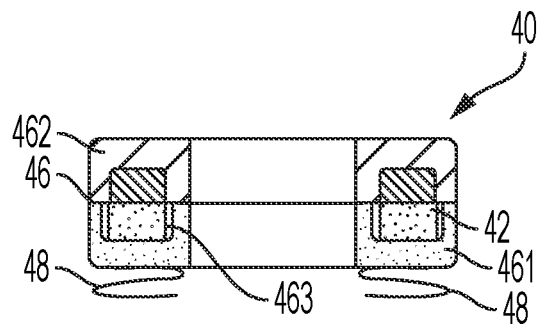
FIG. 3 is a cross sectional view of a heater assembly according to one or more embodiments of the present disclosure.

The system 5 includes a heater assembly 40 disposed concentrically around the nutplate retention fixture 30 and operable to deliver heat to the bonding surface 11 of the nutplate 10. With reference to FIGS. 1 and 3, the heater assembly 40 includes a heating element 42, a temperature sensor 44 operable to measure the temperature of the heating element 42, and a heater housing 46 to encase the heating element 42.

Figure 4A:
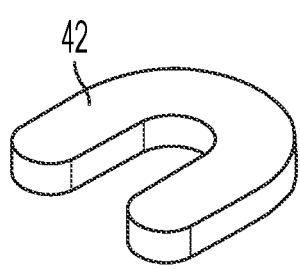
FIG. 4A is a schematic view of a heater assembly of a system for positioning and bonding a nutplate to a substrate comprising at least one aperture according to one or more embodiments of the present disclosure.
Figure 4B:
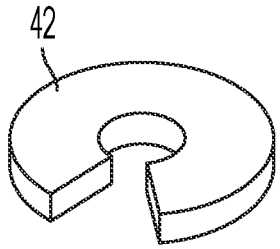
FIG. 4B is a schematic view of a heater assembly of a system for positioning and bonding a nutplate to a substrate comprising at least one aperture according to one or more embodiments of the present disclosure.
Figure 4C:
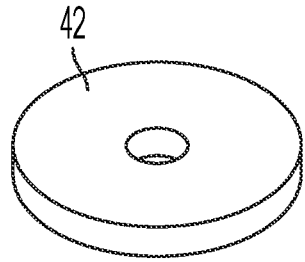
FIG. 4C is a schematic view of a heater assembly of a system for positioning and bonding a nutplate to a substrate comprising at least one aperture according to one or more embodiments of the present disclosure.

The heater assembly 40 may be a variety of different shapes. For example, in various embodiments, the heater assembly 40 may take the form of a ring shape as illustrated in FIG. 4A, "U"-shape as illustrated in FIG. 4B, or "C"-shape as illustrated in FIG. 4C in order to permit the heater assembly 40 to be installed concentrically around the nutplate retention fixture 30. The heater assembly 40 may be installed concentrically around the nutplate retention fixture 30 by sliding the heater assembly 40 along the elastomeric tube 34 or by sliding the heater assembly 40 around the nutplate retention fixture 30 from the side. The opening formed from the central hole or slot forming the rings, "U", or "C" shape of the heater assembly 40 may be sized to provide a free-fit, alternatively known as a non-interference fit, in order to allow the heater assembly 40 to be used across a wide range of sizes for the nutplate retention fixture 30. For example, the heater assembly 40 may be sized to allow for utilization with nutplate retention fixtures 30 sized for nutplates of 3/16, 5/16, or 3/8 inches.

The heating element 42, may encompass various embodiments. In one or more embodiments, the heating element 42 comprises a resistive heating element where an electric current is provided to the heating element 42 and resistance within the heating element 42 generates thermal energy. In one or more embodiments, the heating element 42 is an inductive heating element where an electromagnetic field induces eddy currents in metals of the heating element 42 to generate thermal heating of the heating element 42. As such, the heating element 62 includes power leads which are connected to a power source. It will be appreciated that in further embodiments, a circulating heated fluid such as air, water, or glycol may be utilized instead of resistive or inductive heating.

The heating element 42, in one or more embodiments, may be shaped in substantially the same shape as the heater assembly 40. For example, in embodiments with a ring shaped heater assembly 40 the heating element 42 may also be ring shaped, in embodiments with a "U" shaped heater assembly 40 the heating element 42 may also be "U" shaped, and in embodiments with a "C" shaped heater assembly 40 the heating element 42 may also be "C" shaped. Providing the heating element 42 in shape substantially matching the shape of the heater assembly 40 maximizes the coverage of the heating element 42 and makes it clear to an operator positioning the heater assembly 40 where the heating element 42 is positioned within the heater assembly 40.

The heater housing 46 forms the shell or exterior profile for the heater assembly 40. As such, the heater housing 46 comprises a hollow interior volume sized and configured to encase the heating element 42. In one or more embodiments, the heater housing 46 forms a conformal heat sink and comprises a first segment 461 configured to be positioned proximal the substrate 20 and a second segment 462 configured to be positioned distal the substrate 20 when the heater assembly 40 is mated with the nutplate retention fixture 30. The arrangement of the heating element 42 within the conformal heat sink of the heater housing 46 allows for efficient transfer of heat from the heating element 42 into the substrate 20 in proximity to the nutplate 10 and more specifically the bonding surface 11. The first segment 461 the second segment 462 of the heater housing 46 mate or mate together to for the complete heater housing 46 with the hollow interior volume.

The first segment 461 of the heater housing 46 includes a heating element channel 463 for housing the heating element 62. In one or more embodiments, the heating element channel 463 comprises a profile which substantially matches the shape of the heating element 42 such that the heating element 42 substantially fills the heating element channel 463. Such arrangement minimizes excess air volume within the heating element channel 463 which would reduce the thermal conduction of heat away from the heating element 42 and into the first segment 461 of the heater housing 46.

In one or more embodiments, the first segment 461 of the heater housing 46 is made from a thermally conductive material. For example, in various embodiments, the first segment 461 of the heater housing 46 may be made from aluminum or copper. The thermally conductive material forming the first segment 461 of the heater housing 46 efficiently drives thermal energy generated by the heating element 42 toward the substrate 20 and the bonding surface 11.

In one or more embodiments, the second segment 462 of the heater housing 46 is made from a thermally non-conductive material. For example, in one or more embodiments, the second segment 462 of the heater housing 46 may be made from a high temperature thermoplastic. Forming the second segment 462 of the heater housing 46 from a thermally non-conductive material minimizes unproductive heat loss and reduces exposed surface temperatures as a safety feature. Further, minimizing heat transfer through the second segment 462 of the heater housing 46 avoids heating the heater retention fixture 50. It will be appreciated that all materials have some degree of thermal conductivity; as such it is noted that the conductivity of the second segment 462 of the heater housing 46 may be defined as simply having a thermal conductivity less than the thermal conductivity of the first segment 461 of the heater housing 46. Further, in one or more embodiments, an insulation layer may be provided on an interior surface of the second segment 462 of the heater housing 46 such that the full thickness of the second segment 462 of the heater housing 46 has a lesser thermal conductivity than the first segment 461 of the heater housing 46 while including a shell made from the same material as the first segment 461 of the heater housing 46.

In one or more embodiments, the first segment 461 of the heater housing 46 may additional comprise complaint spacers 48 positioned on a bottom surface of the heater housing 46 to allow the bottom surface to contour to non-flat surfaces. In various embodiments, the compliant spacers 48 may comprise a compliant spring material 481 or a compliant, thermally conductive gasket 482 such as a metal felt. It will be appreciated that the compliant spacers 48 should be formed from thermally conductive material to swiftly transfer thermal energy from the first segment 461 of the heater housing 46 to the substrate 20.

In one or more embodiments, the first segment 461 of the heater housing 46, the second segment 462 of the heater housing 46, or both comprise grooves or channels for routing the temperature sensor 44 and/or power wires 421 for the heating element 42. For example, with reference to FIG. 5A, in one or more embodiments, the second segment 462 of the heater housing 46 may comprise a temperature sensor channel 464 through which the temperature sensor 44 may be routed. The temperature sensor channel 464 may extend 10%, 20%, 30%, 40%, 50%, 60%, 70%, 80%, 90%, 95%, or 10 to 100% of the length or circumference of the second segment 462 of the heater housing 46. Specifically, the temperature sensor channel 464 may be configured and positioned to allow routing of the temperature sensor 44 to the position or positons desired in relation to the heating element 42.

Figure 5A:
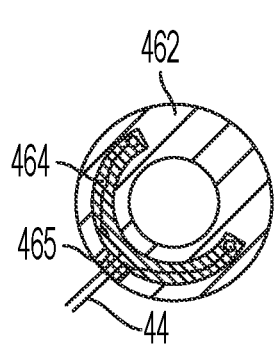
FIG. 5A is a schematic view of a second segment of a heater housing of a heater assembly according to one or more embodiments of the present disclosure.
Figure 5B:
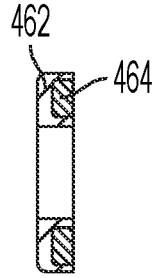
FIG. 5B is a cross sectional view of the second segment of a heater housing of a heater assembly illustrated in FIG. 5A according to one or more embodiments of the present disclosure.
Figure 5C:
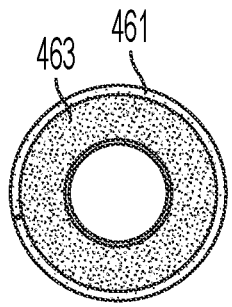
FIG. 5C is a schematic view of a first segment of a heater housing of a heater assembly according to one or more embodiments of the present disclosure.
Figure 5D:
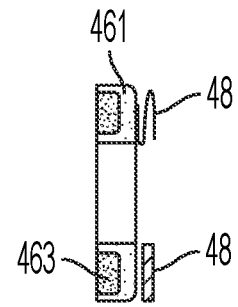
FIG. 5D is a cross sectional view of the first segment of a heater housing of a heater assembly illustrated in FIG. 5C according to one or more embodiments of the present disclosure.

In one or more embodiments, the first segment 461 of the heater housing 46, the second segment 462 of the heater housing 46, or both comprise an access port 465 connecting one or both of the heating element channel 463 and the temperature sensor channel 464 to the surrounding environment. With reference to FIG. 5A, the access port 465 is illustrated as positioned on the second segment 462 providing a pathway for passage of at least the wire(s) of the temperature sensor 46. It will be appreciated that the access port 465 may additionally or alternatively be provided on the first segment 462. The access port 465 provides a pathway for routing the temperature sensor 44 and/or power wires 421 of the heating element 42 outside the heater housing 46.

In order to accurately monitor the curing temperature of the bonding adhesive and ensure appropriate cure profile is executed by a heater controller 60, at least one temperature sensor 44 is provided. The temperature sensor 44 may be mounted onto the surface of the heating element 62 for safe, reliable temperature control of the heater element 62. In one or more embodiments, the system 5 may further comprises a substrate temperature sensor 74 operable to measure the temperature of the heater housing 46 proximal the substrate 20. Specifically, the substrate temperature sensor 74 may be mounted to the bottom of the first segment 461 of the heater housing 46 to permit bonding substructure surface temperature measurement near the bonding surface 11 of the nutplate 10. The temperature data obtained from the temperature sensor 44 and substrate temperature sensor 74, if present, can be logged and provide a feedback mechanism for the heater controller 60 to manage the heating power supplied to the heating element 62. The heater controller 60 also may trigger one or more fail-safe mechanisms built in to the heater controller 60 to prevent excessive power draw above the rated capacity of the heating element 62, heater temperature above the rated operating range of the heating element 62, excessive substrate temperature, or excessive temperature at the bonding surface 11.

The system 5 also includes a heater retention fixture 50 operable to engage with the nutplate retention fixture 30 and maintain the heater assembly 40 in contact with the substrate 20. Specifically, the heater retention fixture 50 provides a retentive force to compress the heater assembly 40 against the substrate 20 ensuring contact for thermal transfer. Further, compression of the heater assembly 40 into the substrate 20 with the heater retention fixture 50 additionally compresses the bonding surface 11 of the nutplate 10 against the substrate 20 during curing procedures, thereby enhancing the bond at the bonding surface.

In one or more embodiments and with reference to FIG. 1, the heater retention fixture 50 comprises a spring-loaded nut clamp. The spring-loaded nut clamp is provided concentrically around the threaded insert 32 and aligned with the second region 322 of the external threads at a position distal the substrate 20 relative to the heater assembly 40. Further, the heater retention fixture 50 is configured to secure the heater retention fixture 50 to the nutplate retention fixture 30 and capture the heater assembly 40 against the substrate 20.

In one or more embodiments, and with reference to FIGS. 1, 6A-6B, and 7A-7C, the spring-loaded nut clamp comprises an outer housing 52, a translating threaded member 54 comprising threads 541 configured to mate with the second region 322 of the external threads of the threaded insert 32, a compression spring 56 configured to advance the translating threaded member 54, and at least one retaining pin 58 configured to retain the translating threaded member 54 within the outer housing 52. The outer housing 52 provides a base for installation of the translating threaded member 54, the compression spring 56, and the retaining pin 58. The outer housing 52 comprises a central bore 521 sized to allow passage of the threaded insert 32.

In one or more embodiments, the outer housing 52 has a hole forming a spring housing 561. The spring housing 561 may be formed from a blind hole disposed in a peripheral wall of the outer housing 52 with the blind hole formed perpendicular to the central bore 521. In further embodiments, the spring housing 561 may be formed from a through hole disposed in a peripheral wall of the outer housing 52 with the through hole formed perpendicular to the central bore 52. When the spring housing 561 is formed from a through hole, a dowel or other obstruction may be placed within the spring housing 561 to prevent translation of the compression spring 56 completely through the spring housing 561.

In one or more embodiments, the outer housing 52 has a translating member passage 541 in a peripheral wall of the outer housing 52 opposed the spring housing 561 such that the translating member passage 541 and the spring housing 561 are co-axial along an axis bisecting the central bore 521. The compression spring 56 is placed in the spring housing 561 and the translating threaded member 54 is placed in the translating member passage 541 in a position abutting the compression spring 56. Such arrangement allows for the translating threaded member 54 to be advanced through the translating member passage 541, thereby compressing the compression spring 54. Once the advancing force is removed from the translating threaded member, the compression spring 54 extends toward a relaxed position, thereby advancing the translating threaded member 54 back through the translating member passage 541 in an opposite direction.

In one or more embodiments, the translating threaded member 54 is held within the outer housing 52 and provided with a limited translation pathway using the one or retaining pins 58. Specifically, the retaining pins 58 prevent the translating threaded member 54 and compression spring 56 from being dislodged from the outer housing 52 during normal use. The retaining pin 58 may secure the translating threaded member 54 by securing the retaining pin 58 in the outer housing 52 at a location which passes through a retaining slot 581 provided in the translating threaded member 54. In the provided figures, the retaining pin 58 is shown originated in a direction parallel to the direction of the threaded insert 32 when in operation, but it will be appreciated that the retaining pin 58 may also be provided in an orientation perpendicular to the direction of the threaded insert 32 when in operation. The arrangement shown may be preferred as such is coaxial with the central bore 521 which eases machining burden, but both arrangements are envisioned as possible.

In one or more embodiments, the translating threaded member 54 comprises a central orifice 541 sized to allow passage of the threaded insert 32. The central orifice 541 has internal threads 543, alternatively known as female threads, which match the diameter, pitch, and handedness of the external threads in the second region 322 of the threaded insert 32. The central orifice 542 of the translating threaded member 54 is sized and positioned to allow passage of the threaded insert 32 when the translating threaded member 54 is extended into the outer housing 52 through compression of the compression spring 56. Additionally, the internal threads 543 disposed on the central orifice 541 are positioned such that upon relaxation of the compression spring 56 and a return of the translating threaded member 54 to a resting position, the internal threads 543 of the central orifice 542 engage with the second region 322 of the external threads of the threaded insert 32. As such, the internal threads 543 of the central orifice 542 may be provided on only a portion of along an entirety of an interior face of the central orifice 542.

It is noted that while the translating threaded member 54 is shown in FIG. 6A as having a width less than the diameter of the central bore 521 in the outer housing 52, it is equally envisioned that the width of the translating threaded member 54 and the translating member passage 541 could be extended such that they match or exceed the diameter of the central bore 52 without deviating from the intended scope of the present disclosure.

With reference to FIGS. 7A to 7C, in order to translate the translating threaded member 54 within the translating member passage 541 the user may apply a force along the axis of the translating member passage 541 in order to compress the compression spring 56 disengaging the translating threaded member 54 from the threaded insert 32. Specifically, with reference to FIG. 7A, the translating threaded member 54 may be depressed to reposition the internal threads 542 of the central orifice 542 allowing the heater retention fixture 50 to be freely slid over the threaded insert 32 as shown in FIG. 7B. Subsequently, when the user removes this force as shown in FIG. 7C, the compression spring 56 returns the translating threaded member 54 to its original position and automatically engages the translating threaded member 54 with the threaded insert 32. It will be appreciated that when the translating threaded member 54 is engaged with the threaded insert 32 the entire heater retention fixture 50 may be rotated to advance the translating threaded member 54 along the threaded insert 32 to generate a compressive force of the heater assembly 40 and the nutplate 10 each into the substrate 20. Such rotation of the heater retention foxitire 50 generates a controlled tension force resulting in controlled compression of the heater assembly 40 onto the outer surface of the substrate 20 and within the adhesive bondline at the bonding surface 11. It will be appreciated that the compression spring 56 may act in the manner of a clutch to control the maximum attainable torque within the heater retention fixture 50. The controlled tension in the nutplate retention fixture 30 as applied to the threaded insert 32 also produces a corresponding compression load in the bondline, leading to improved heat transfer and bond strength.

In one or more embodiments, the spring-loaded nut clamp is integral with the heater housing 46. Specifically, it is envisioned that the heater assembly 40 and the heater retention fixture 50 could be combined into a single unit. For example, the second segment 462 of the heater housing 46 may also serve as the outer housing 52 of the spring-loaded nut clamp forming the heater retention fixture 50. For completeness, it is also noted that in one or more embodiments, the spring-loaded nut clamp is provided separately from the heater housing 46 as illustrated in FIG. 1.

Turning from the above discussion of components of the system 5 for positioning and bonding a nutplate to a substrate 20, the following discussion relates to the utilization of these components in method of positioning and bonding a nutplate 10 to a substrate 20. In one or more embodiments, the method comprises coupling the nutplate 10 with the nutplate retention fixture 30, applying adhesive onto the bonding surface 11 of the nutplate 10, inserting the nutplate retention fixture 30 through an aperture 25 of the substrate 20 until a surface of the substrate 20 contacts the bonding surface 11 having adhesive applied thereon, removing a portion of the elastomeric tube 34 provided with the nutplate retention fixture 30 to expose the second region 322 of the external threads of the threaded insert 32, positioning the heater assembly 40 concentrically around the nutplate retention fixture 30 in a position operable to deliver heat to the bonding surface 11 of the nutplate 10, securing the heater retention fixture 50 to the nutplate retention fixture 30 to maintain the heater assembly 40 in contact with the substrate 20, and adhering the nutplate 10 to the bonding surface 11 by applying heat through the heater assembly 30.

In this accelerated cure process, the bulk of the material cure can occur in a shortened timespan due to the desirable cure state, but further undesired reactions from elevated temperature "post-cure" are also avoided. Without being bound by theory, in a polymer material such as a two-part epoxy adhesive, the reaction of smaller precursor molecules (e.g., monomers, pre-polymers) results in the growth of larger and increasing molecular weight chains of the constituent molecules. If the polymerization is allowed to proceed only at room temperature, the formation of networked polymer chains will gradually impede the mobility of remaining reactive molecules, essentially slowing down and eventually arresting the polymerization and cure of the material to achieve specified polymer properties. At an elevated temperature, the mobility of any remaining reactive molecules will be increased and thus increasing the polymerization rate of the material, thus reducing the time required to achieve a similar cure state comparing with curing at room temperature.

In one or more embodiments, the process may also comprise preparing the surface of the panel 20. This may involve cleaning the panel 20 surface to facilitate better adhesion once the nutplate 10 is adhesively bonded to the panel 20.

Additionally, to monitor the adhesive curing and bonding of the nutplate 10 to the panel 20, a feedback temperature control mechanism may be utilized so that the desired temperature profile can be maintained irrespective of panel material. The feedback temperature control mechanism may include the at least one temperature sensor 44 in communication with the controller 60. In specific embodiments, the controller for the temperature and the power source for the heating component may be integrated into the same unit to form the feedback temperature control mechanism.

The system 5 may further comprise a digital record retention system. The digital record retention system provides easily retrievable records of installation parameters, maintenance history, and operation status, including environmental conditions, on all nutplate parts in-situ on the substrate to facilitate logistic and maintenance planning. In one or more embodiments, digital record retention system enables remote assessment of part status (for example, service hour history) or part curing status (for example, parameters of nutplate installation). Such digital record retention system also provides end-to-end traceability on parts and makes collected information readily available to the technicians and engineers involved in logistic and maintenance planning through computer networks, wireless networks, and/or mobile devices.

The digital record retention system comprises a writable storage medium configured to record process parameters of the bonding of the nutplate to the substrate including environmental conditions at time of bonding, temperature readings from the at least one temperature sensor with respect to time, and identifying codes assigned to each component of the system utilized in bonding of the nutplate to the substrate. In addition it can also record information related to the status of the system 5 such as power and error status. Specifically, the environmental conditions at time of bonding may include air temperature and humidity levels at the location and time of nutplate adherence. The temperature readings from the at least one temperature sensor with respect to time may also be recorded to provide a plot of adhesive and nutplate heating during the cure cycle. The temperature profile may provide insight to strength parameters of the bond and provide guidance in the event of bond failure or bonding process disruption such as power failure. Further, identifying codes assigned to each component of the nutplate retention system utilized in bonding of the nutplate to the substrate provides traceable history in the event of a bond failure. For example, unique serial numbers and/or identifying bar codes may be provided on each nutplate, fixture, heater, adhesive and other component used in the installation of the nutplate on the substrate to allow scanning and tracking for each step and variable of each individual nutplate installation event. The recording of the adhesive batch number used on each nutplate installation allows for accounting of suspect nutplate installations in the event of later determination of faulty adhesive. Notes from technicians during nutplate installation or later inspections may also be recorded to provide a more complete portfolio of data regarding the nutplate installation.

In one or more embodiments, the desired collected data points may be scanned or entered into the digital record retention system in real-time during nutplate installation. In some embodiments, the digital record retention system and the heater controller may be combined into a single integrated system. An integrated system combines the heating and installation protocols with the data retention protocols into a single unified system. The integrated nutplate installation and digital record retention system in one or more embodiments may prompt the installation or maintenance technician to scan a barcode or input a serial number during installation or maintenance operations to develop a complete data set for each nutplate installation event.

Depending on the maintenance location or field environment, the heater controller and digital record retention system may be a wall-powered station or a handheld, battery-powered, mobile unit. A battery powered unit may also have corresponding charging station to carry ample supply of charged batteries or power packs to minimize interruptions of maintenance operation.

Having described various embodiments, it should be understood that the various aspects of the system and method for positioning and bonding a nutplate to a substrate are described and such aspects may be utilized in conjunction with various other aspects.

In a first aspect, the disclosure provides a system for positioning and bonding a nutplate to a substrate comprising at least one aperture. The system comprises a nutplate retention fixture comprising a threaded insert and an elastomeric tube engaged with the threaded insert, wherein the threaded insert is operable to engage the nutplate at one end and extend through one aperture of the substrate, the threaded insert comprises at least two distinct regions of external threads, with a first region configured for threaded engagement with internal threads on the nutplate and a second region having an opposite handedness than the first region, and the elastomeric tube is configured to anchor the nutplate retention fixture at the aperture and secure the nutplate in contact with the substrate; a heater assembly disposed concentrically around the nutplate retention fixture and operable to deliver heat to a bonding surface of the nutplate, wherein the heater assembly comprises: a heating element, a temperature sensor operable to measure the temperature of the heating element, and a heater housing, the heater housing comprising a hollow interior to encase the heating element; a heater controller operable to control the output from the heating element; and a heater retention fixture operable to engage with the nutplate retention fixture and maintain the heater assembly in contact with the substrate, wherein the heater retention fixture comprises: a spring-loaded nut clamp provided concentrically around the threaded insert aligned with the second region of the external threads at a position distal the substrate relative to the heater assembly and configured to secure the heater retention fixture to the nutplate retention fixture.

In a second aspect, the disclosure provides the system of the first aspect, in which the spring-loaded nut clamp comprises an outer housing, a translating threaded member comprising threads configured to mate with the second region of the external threads of the threaded insert, a compression spring configured to advance the translating threaded member, and at least one retaining pin configured to retain the translating threaded member within the outer housing.

In a third aspect, the disclosure provides the system of the second aspect, in which the translating threaded member comprises a central orifice sized to allow passage of the threaded insert, the threads configured to mate with the second region of the external threads of the threaded insert positioned on a portion of an interior face of the central orifice.

In a fourth aspect, the disclosure provides the system of any of the first through third aspects, in which the spring-loaded nut clamp is integral with the heater housing.

In a fifth aspect, the disclosure provides the system of any of the first through third aspects, in which the spring-loaded nut clamp is provided separately from the heater housing.

In a sixth aspect, the disclosure provides the system of any of the first through fifth aspects, in which the system further comprises a substrate temperature sensor operable to measure the temperature of the heater housing proximal the substrate.

In a seventh aspect, the disclosure provides the system of any of the first through sixth aspects, in which the heater housing forms a conformal heat sink and comprises a first segment configured to be positioned proximal the substrate and a second segment configured to be positioned distal the substrate.

In an eighth aspect, the disclosure provides the system of the seventh aspect, in which the first segment is formed from a thermally conductive material and the second segment is formed from a substantially thermally non-conductive material.

In a ninth aspect, the disclosure provides the system of the seventh or eighth aspect, in which the first segment of the heater housing comprises one or more complaint spring members positioned on a bottom surface of the heater housing to allow the bottom surface of the heater housing to contour to non-flat surfaces.

In a tenth aspect, the disclosure provides the system of any of the seventh through ninth aspects, in which the first segment of the heater housing comprises a compliant, thermally conductive gasket positioned on a bottom surface of the heater housing to allow the bottom surface of the heater housing to contour to the substrate.

In an eleventh aspect, the disclosure provides the system of the tenth aspect, in which the compliant, thermally conductive gasket comprises a metal felt.

In a twelfth aspect, the disclosure provides the system of the seventh aspect, in which the first segment, the second segment, or both comprise grooves or channels for routing the temperature sensor and/or power wires for the heating element.

In a thirteenth aspect, the disclosure provides the system of any of the first through twelfth aspects, in which the heater assembly substantially comprises an "O" shape, a "U"-shape, or a "C"-shape.

In a fourteenth aspect, the disclosure provides a method of positioning and bonding a nutplate to a substrate comprising at least one aperture. The method comprises coupling a nutplate with a nutplate retention fixture, the nutplate retention fixture comprising a threaded insert and an elastomeric tube engaged with the threaded insert, wherein the threaded insert is operable to engage the nutplate at one end and extend through one aperture of the substrate, the threaded insert comprises at least two distinct regions of external threads, with a first region configured for threaded engagement with internal threads on the nutplate and a second region having an opposite handedness than the first region, and the elastomeric tube is configured to anchor the nutplate retention fixture at the aperture and secure the nutplate in contact with the substrate; applying adhesive onto a bonding surface of the nutplate; inserting the nutplate retention fixture through an aperture of the substrate until a surface of the substrate contacts the bonding surface having adhesive applied thereon; removing a portion of the elastomeric tube to expose the second region of the external threads of the threaded insert positioning a heater assembly concentrically around the nutplate retention fixture in a position operable to deliver heat to the bonding surface of the nutplate, wherein the heater assembly comprises: a heating element, a temperature sensor operable to measure the temperature of the heating element, and a heater housing, the heater housing comprising a hollow interior to encase the heating element; securing a heater retention fixture to the nutplate retention fixture to maintain the heater assembly in contact with the substrate, wherein the heater retention fixture comprises: a spring-loaded nut clamp provided concentrically around the threaded insert aligned with the second region of the external threads at a position distal the substrate relative to the heater assembly and configured to secure the heater retention fixture to the nutplate retention fixture; and adhering the nutplate to the bonding surface by applying heat through the heater assembly.

In a fifteenth aspect, the disclosure provides the method of the fourteenth aspect, in which the spring-loaded nut clamp comprises an outer housing, a translating threaded member comprising threads configured to mate with the second region of the external threads of the threaded insert, a compression spring configured to advance the translating threaded member, and at least one retaining pin configured to retain the translating threaded member within the outer housing.

In a sixteenth aspect, the disclosure provides the method of the fifteenth aspect, in which the translating threaded member comprises a central orifice sized to allow passage of the threaded insert, the threads configured to mate with the second region of the external threads of the threaded insert positioned on a portion of an interior face of the central orifice.

In a seventeenth aspect, the disclosure provides the method of any of the fourteenth through sixteenth aspects, in which the heater housing forms a conformal heat sink and comprises a first segment configured to be positioned proximal the substrate and a second segment configured to be positioned distal the substrate.

In an eighteenth aspect, the disclosure provides the method of the seventeenth aspect, in which the first segment of the heater housing comprises one or more complaint spring members positioned on a bottom surface of the heater housing to allow the bottom surface of the heater housing to contour to non-flat surfaces.

In a nineteenth aspect, the disclosure provides the method of the seventeenth or eighteenth aspect, in which the first segment of the heater housing comprises a compliant, thermally conductive gasket positioned on a bottom surface of the heater housing to allow the bottom surface of the heater housing to contour to the substrate.

In a twentieth aspect, the disclosure provides the method of any of the fourteenth though nineteenth aspects, in which the heater assembly substantially comprises an "O" shape, a "U"-shape, or a "C"-shape.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Optional or optionally means that the subsequently described event or circumstances may or may not occur. The description includes instances where the event or circumstance occurs and instances where it does not occur.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

The invention claimed is:

1. A system for positioning and bonding a nutplate to a substrate comprising at least one aperture, the system comprising:
   a nutplate retention fixture comprising a threaded insert and an elastomeric tube engaged with the threaded insert, wherein
      the threaded insert is operable to engage the nutplate at one end and extend through one aperture of the substrate,
      the threaded insert comprises at least two distinct regions of external threads, with a first region configured for threaded engagement with internal threads on the nutplate and a second region having an opposite handedness than the first region, and
      the elastomeric tube is configured to anchor the nutplate retention fixture at the aperture and secure the nutplate in contact with the substrate;
   a heater assembly disposed concentrically around the nutplate retention fixture and operable to deliver heat to a bonding surface of the nutplate, wherein the heater assembly comprises:
      a heating element,
      a temperature sensor operable to measure a temperature of the heating element, and
      a heater housing, the heater housing comprising a hollow interior to encase the heating element;
   a heater controller operable to control an output from the heating element; and
   a heater retention fixture operable to engage with the nutplate retention fixture and maintain the heater assembly in contact with the substrate, wherein the heater retention fixture comprises:
      a spring-loaded nut clamp provided concentrically around the threaded insert aligned with the second region of the external threads at a position distal the substrate relative to the heater assembly and configured to secure the heater retention fixture to the nutplate retention fixture.

2. The system of claim 1, wherein the spring-loaded nut clamp comprises an outer housing, a translating threaded member comprising threads configured to mate with the second region of the external threads of the threaded insert, a compression spring configured to advance the translating threaded member, and at least one retaining pin configured to retain the translating threaded member within the outer housing.

3. The system of claim 2, wherein the translating threaded member comprises a central orifice sized to allow passage of the threaded insert, the threads configured to mate with the second region of the external threads of the threaded insert positioned on a portion of an interior face of the central orifice.

4. The system of claim 1, wherein the spring-loaded nut clamp is integral with the heater housing.

5. The system of claim 1, wherein the spring-loaded nut clamp is provided separately from the heater housing.

6. The system of claim 1, wherein the system further comprises a substrate temperature sensor operable to measure the temperature of the heater housing proximal the substrate.

7. The system of claim 1, wherein the heater housing forms a conformal heat sink and comprises a first segment configured to be positioned proximal the substrate and a second segment configured to be positioned distal the substrate.

8. The system of claim 7, wherein the first segment is formed from a thermally conductive material and the second segment is formed from a substantially thermally non-conductive material.

9. The system of claim 7, wherein the first segment of the heater housing comprises one or more complaint spring members positioned on a bottom surface of the heater housing to allow the bottom surface of the heater housing to contour to non-flat surfaces.

10. The system of claim 7, wherein the first segment of the heater housing comprises a compliant, thermally conductive gasket positioned on a bottom surface of the heater housing to allow the bottom surface of the heater housing to contour to the substrate.

11. The system of claim 10, wherein the compliant, thermally conductive gasket comprises a metal felt.

12. The system of claim 7, wherein the first segment, the second segment, or both comprise grooves or channels for routing the temperature sensor and/or power wires for the heating element.

13. The system of claim 1, wherein the heater assembly substantially comprises an "O" shape, a "U"-shape, or a "C"-shape.

14. A method of positioning and bonding a nutplate to a substrate comprising at least one aperture, the method comprising:
    coupling a nutplate with a nutplate retention fixture, the nutplate retention fixture comprising a threaded insert and an elastomeric tube engaged with the threaded insert, wherein
        the threaded insert is operable to engage the nutplate at one end and extend through one aperture of the substrate,
        the threaded insert comprises at least two distinct regions of external threads, with a first region configured for threaded engagement with internal threads on the nutplate and a second region having an opposite handedness than the first region, and
        the elastomeric tube is configured to anchor the nutplate retention fixture at the aperture and secure the nutplate in contact with the substrate;
    applying adhesive onto a bonding surface of the nutplate;
    inserting the nutplate retention fixture through an aperture of the substrate until a surface of the substrate contacts the bonding surface having adhesive applied thereon;
    removing a portion of the elastomeric tube to expose the second region of the external threads of the threaded insert
    positioning a heater assembly concentrically around the nutplate retention fixture in a position operable to deliver heat to the bonding surface of the nutplate, wherein the heater assembly comprises:
        a heating element,
        a temperature sensor operable to measure a temperature of the heating element, and
        a heater housing, the heater housing comprising a hollow interior to encase the heating element;
    securing a heater retention fixture to the nutplate retention fixture to maintain the heater assembly in contact with the substrate, wherein the heater retention fixture comprises:
        a spring-loaded nut clamp provided concentrically around the threaded insert aligned with the second region of the external threads at a position distal the substrate relative to the heater assembly and configured to secure the heater retention fixture to the nutplate retention fixture; and
    adhering the nutplate to the bonding surface by applying heat through the heater assembly.

15. The method of claim 14, wherein the spring-loaded nut clamp comprises an outer housing, a translating threaded member comprising threads configured to mate with the second region of the external threads of the threaded insert, a compression spring configured to advance the translating threaded member, and at least one retaining pin configured to retain the translating threaded member within the outer housing.

16. The method of claim 15, wherein the translating threaded member comprises a central orifice sized to allow passage of the threaded insert, the threads configured to mate with the second region of the external threads of the threaded insert positioned on a portion of an interior face of the central orifice.

17. The method of claim 14, wherein the heater housing forms a conformal heat sink and comprises a first segment configured to be positioned proximal the substrate and a second segment configured to be positioned distal the substrate.

18. The method of claim 17, wherein the first segment of the heater housing comprises one or more complaint spring members positioned on a bottom surface of the heater housing to allow the bottom surface of the heater housing to contour to non-flat surfaces.

19. The method of claim 17, wherein the first segment of the heater housing comprises a compliant, thermally conductive gasket positioned on a bottom surface of the heater housing to allow the bottom surface of the heater housing to contour to the substrate.

20. The method of claim 14, wherein the heater assembly substantially comprises an "O" shape, a "U"-shape, or a "C"-shape.

* * * * *